United States Patent [19]

Scott et al.

[11] Patent Number: 5,382,633
[45] Date of Patent: Jan. 17, 1995

[54] MODIFIED POLYMERS

[75] Inventors: Gerald Scott, Stokesley; Sahar Al-Malaika, Sutton Coldfield, both of England

[73] Assignee: 3i Research Exploitation Limited, London, England

[21] Appl. No.: 678,301

[22] PCT Filed: Aug. 9, 1989

[86] PCT No.: PCT/GB89/00909
§ 371 Date: Apr. 8, 1991
§ 102(e) Date: Apr. 8, 1991

[87] PCT Pub. No.: WO90/01506
PCT Pub. Date: Feb. 22, 1990

[30] Foreign Application Priority Data

Aug. 9, 1988 [GB] United Kingdom ............... 8818880

[51] Int. Cl.$^6$ ............... C08F 283/00; C08F 283/02; C08F 283/04; C08F 255/00; C08F 259/04; C08F 279; C08F 02; C08F 265/04; C08L 51/06; C08L 51/08
[52] U.S. Cl. ............................. 525/279; 525/63; 525/72; 525/73; 525/77; 525/82; 525/263; 525/281; 525/288; 525/291; 525/296; 525/303; 525/305; 525/309; 525/420; 525/445; 525/455
[58] Field of Search ............... 525/263, 279, 240, 288, 525/303, 309, 281, 291, 296, 305, 72, 73, 77, 82, 63, 420, 445, 455

[56] References Cited

U.S. PATENT DOCUMENTS

| | | | |
|---|---|---|---|
| 4,032,592 | 6/1977 | Ogihara et al. | 525/265 |
| 4,058,583 | 11/1977 | Glander et al. | 522/109 |
| 4,130,534 | 12/1978 | Coran et al. | 525/232 |
| 4,591,615 | 5/1986 | Aldred et al. | 525/194 |
| 4,910,245 | 3/1990 | Flynn et al. | 525/194 |

*Primary Examiner*—Vasu S. Jagannathan
*Attorney, Agent, or Firm*—Nixon & Vanderhye

[57] ABSTRACT

A modified polymer is described comprising a thermoplastic polymer composition comprising a graft copolymer between (1) a preformed thermoplastic polymer and (2) a monomer composition comprising (a) at least one polymerisable monomer containing a polymerisable group and at least one functional polymer-modifying group and (b) at least one comonomer containing at least two polymerisable groups, said copolymer being substantially free of unbound monomer. Such polymers can be produced by reacting together, in a melt and in the presence of free radicals whilst applying shear to the melt, the preformed thermoplastic polymer to be modified, the polymerisable monomer, and the comonomer, thereby to graft said monomer to said preformed polymer leaving substantially no unbound monomer, the reaction being continued for a period of time sufficient to produce a graft copolymer that is thermoplastic and can be blended with an unmodified polymer. A free radical generator can be added, if desired.

33 Claims, No Drawings

MODIFIED POLYMERS

This invention relates to the modification of thermoplastic polymers to give thermoplastic polymer adducts which contain residues of modifier molecules bound to the polymeric substrate.

Thermoplastic polymers usually comprise essentially linear molecules or molecules with only relatively short side chains. They do not, as a general rule, contain significant amounts of cross-linking, since cross-linking tends to increase the rigidity of the polymer through formation of a tangled matrix of cross-linked polymer chains. Include within this class of polymers are vinyl polymers and copolymers and substantially linear condensation polymers. Such vinyl polymers and copolymers include, for example, polyolefins, such as polyethylene and polypropylene, polyvinyl chloride, polystyrene, ethylene-propylene co- and ter-polymers, polyacrylates, polymethacrylates, polyacrylonitrile, and acrylonitrile-butadiene-styrene terpolymers, to name but a few. Examples of thermoplastic condensation polymers include polyamides, polyesters, and linear and substantially linear polyurethanes.

There is increasing concern about the migration and loss of additives from thermoplastic polymers. This concern arises from several causes. Firstly, if the additives (for example, antioxidants, stabilisers, plasticisers, antistatic agents, photosensitisers and the like) are lost from the polymer by volatilisation or leaching, then they no longer fulfil their intended purpose. Secondly, when additives are leached into the contacting medium for example by foodstuffs or by other extractants that are subsequently ingested, then they may cause toxicity in the host environment. Thirdly, when polymers are used in medical applications, for example in surgical goods, prostheses or body implants, it is essential that no migration of additives occurs since although polymers are normally biologically inert, low molecular weight additives are generally not so and because they are readily leached into the biosystem, they cause toxicity problems. Traditionally, additives, and particularly stabilisers, have been relatively low molecular weight materials of high volatility and with marginal compatibility with the base polymer.

Recently, it has been proposed to overcome the problem of migration and loss of antioxidants and stabilisers by copolymerising antioxidants containing vinyl groups with a major proportion of conventional monomers to give polymers containing the appropriate antioxidant in polymerised form at the concentration required for use during service. This is an expensive procedure and to overcome this it has been proposed, in, for example, U.S. Pat. No. 4,354,007 to Scott (hereinafter referred to as "the '007 Patent"), that a wide variety of antioxidants and stabilisers may be reacted with preformed polymers in the presence of free radicals to provide a stabilised polymer directly or to make an intermediate, highly concentrated polymer-bound adduct which may be blended with further amounts of a suitable compatible base polymer to give an antioxidant modified polymer suitable for a wide variety of end use applications. The technique is particularly applicable to rubbers in latex form.

The '007 patent describes a wide variety of antioxidant and stabiliser molecules including compounds selected from categories which include chain-breaking or peroxide-decomposing antioxidants, ultraviolet screening agents, triplet quenchers and metal deactivators. In terms of a limitation on the scope of the stabiliser compounds that may be used, perhaps the most significant structural limitation is that it should be capable of being activated by a free radical in the polymer (see col. 1, lines 40–50). In this regard, however, it has been found with regard to the unsaturated or vinyl group-containing stabiliser compounds described in the '007 patent and also as to similar stabiliser compounds which have been suggested by others for grafting to pre-formed polymers in the presence of free radicals, that frequently the reactivity of the stabiliser molecules containing polymerisable groups may be such that the stabiliser may tend to homopolymerise with itself to form a polymer or oligomer. Such an oligomer may, of course, have increased molecular weight as compared to the individual stabiliser molecule and this increased weight may inhibit undesired volatilisation, and/or migration of the stabiliser in the polymer composition.

Unfortunately, however, homopolymerisation or oligomerisation of the additives generally results in decreased activity of the additive in the polymer system. Thus antioxidants and stabilisers generally show overall lower stabilisation activity compared with a polymer system containing a comparable amount of grafted antioxidant or stabiliser molecules, and in addition, the lower molecular weight polymers formed by homopolymerisation of the additive are readily extracted from the polymer by extracting media.

In U.S. Pat. No. 4,743,657 to Rekers and Scott a method is proposed for preparing a polymer bound stabiliser which comprises reacting a stabiliser precursor molecule containing a reactive double bond which is not readily homopolymerisable with a pre-formed polymer in the presence of a free radical.

In co-pending European Patent Application No. 88302389.7 to Scott, Al-Malaika and Ibrahim filed 18th Mar. 1988 (which was published on 5th Oct. 1988 as EP-A-0285293) there is described a process for preparing a bound antioxidant polymer concentrate for use as a masterbatch for blending with unmodified polymers which comprises grafting one or more acrylic or alkylacrylic esters or amides containing a hindered amine group onto the polymer in the presence of a radical generator at a temperature of 100° C. to 350° C., the molar ratio of said radical generator to said ester or amide being from 0.001:1 to 1:1, the reaction being typically carried out in a melt and being continued for a time such that the melt viscosity of the polymer which increases initially during the reaction has reduced to a level which permits the concentrate to be homogeneously blended subsequently into an unstabilised polymer.

EP-A-0247861 to Bromine Compounds Ltd. describes flame retardant polymer compositions possessing non-linear structural configurations which are produced by reacting a preformed backbone polymer selected from polyolefins or styrenic polymers or copolymers thereof with a tribromophenoxy- or pentabromophenoxy-ethyl-ester of acrylic- or methacrylic acid. It is stated at page 4 line 49 et seq.:

"The compositions according to the present invention may be prepared by any of the conventional technique of free radical grafting or crosslinking processes used, e.g. mechanical, thermal radiation induced, or chemically induced and by any of the technologies commonly used such as bulk, solution, emulsion suspension polymerization or reactive melt processing.

Whereas the system according to the invention involves a polymerization between a preformed polymer and the flame retardant reagent, one may conceive to incorporate crosslinking activators which will further enhance the efficiency of the crosslinking reaction.

It is usual to incorporate a crosslinking/grafting initiator e.g. organic peroxide, which enhances the above reaction. In the case of crosslinking, a coagent multifunctional crosslinking e.g. triallyl cyanurate may be used to improve efficiency and crosslinking density."

In discussing Table 3 at page 6 line 64 et seq. it is stated that:

". . . the flame retardant reagents used according to the present invention, result in a very high degree of crosslinking as shown by the gel content."

Amongst coagents suggested for crosslinking are bisazodicarboxylates, diallyl phthalate, triallyl cyanurate, triallyl isocyanurate, divinylbenzene, $S_2Cl_2$, dimaleimides, ethylene dimethacrylate, ethylene glycol dimethacrylate, and 1,3-butylene glycol dimethacrylate. Typical processing conditions include blending masterbatches, elastomer and components (except dicumyl peroxide) in the plasticorder at 125° C. for 20 minutes at 20–25 r.p.m. followed by introduction of the peroxide and mixing it into the polymer for 3 minutes. The molten mass was removed from the mixing cell, transferred to a press and cured into a plate 2 mm thick for 30–45 minutes at 130° C.

EP-A-0044233 to Société Chimique des Charbonnages S.A. describes a process in which styrene is polymerised in the presence of a rubbery terpolymer of ethylene, propylene and a third component, such as ethylidene norbornene, in the presence of a peroxide characterised in that the rubbery solution of monomers is polymerised in the mass in the presence of a monomer selected from divinylbenzene, triallyl cyanurate and glycol acrylate. The resultant product is cross-linked since it has a significant gel content.

Production of cross-linked polypropylene is described in JP-A-58/67446 to Tokuyama Soda K.K. According to this proposal a polymer which is polypropylene, a propylene/ethylene block or random copolymer, a propylene/α-olefin copolymer or a mixture thereof is blended with an unsaturated carboxylic acid such as maleic anhydride, a crosslinking aid, such as divinylbenzene, divinyltoluene, diallyl glycerate or liquid rubber comprising a diene monomer, and an organic peroxide, and the resulting blend is hot pressed against a metal product at more than the melting point of the polymer and then heated to a temperature higher than the decomposition point of the organic peroxide to crosslink the polymer.

Graft copolymers for use as ion exchange fibres are described in JP-A-53/8693 and JP-A-53/8694 to Japan Atomic Energy Research; in the former specification polyamides and in the latter specification polyesters undergo graft polymerisation with hydroxystyrenes and/or acyloxystyrenes, preferably in the presence of polyene compounds, such as divinylbenzene, using ionising radiation.

Although many attempts have been made to produce non-extractable antioxidants and stabilisers by polymerising, copolymerising or grafting-of antioxidants containing polymerisable vinyl groups, few commercial products are available in spite of the substantial activity in the patent literature. The literature has been reviewed in "Developments in Polymer Stabilisation -4" (Ed: G. Scott) 1981, page 181, and, ACS Symposium. Series 280. 173 (1985).

The reasons for the lack of commercial success of the prior art are essentially:

(i) Homopolymerised antioxidants are incompatible with other polymers and consequently have low antioxidant activity.

(ii) Copolymers of vinyl antioxidants and normal monomers, although oxidatively stable, are much more expensive to manufacture than conventional large tonnage plastics such as polyethylene, polypropylene, polyvinyl chloride and polystyrene since the scale of manufacture is much reduced. No new oxidatively stable plastics based on these monomers are believed to be in commercial production.

(iii) Grafting of vinyl antioxidants and stabilisers on to preformed polymers has been widely reported but, again, no commercial products have been produced since the efficiency of the binding process is generally low and the products so produced are not sufficiently effective to justify the cost of the modification procedure.

The cost of modifying all the polymer substrate can in principle be avoided by carrying out the antioxidant grafting process in such a way as to produce a concentrated masterbatch of bound antioxidant which can subsequently be used as a normal additive for polymers during processing. This procedure has been used previously for thiol adducts to the double bond in rubbers, but is much more difficult to carry out on saturated polymers due to the inefficiency of the grafting process referred to above.

An object of the present invention is to obviate or mitigate the aforesaid disadvantages. In particular the invention seeks to provide a method of making graft copolymers in which the amount of residual monomeric material left in the resulting graft copolymer is reduced to a very low content and under favourable circumstances substantially to zero or near zero. It further seeks to provide graft copolymers containing functional groups in which the degree of binding of the monomer containing the functional groups is enhanced compared with prior art methods.

According to the present invention there is provided a modified polymer capable of being blended as a masterbatch with an unmodified polymer. This modified polymer is comprises of a thermoplastic polymer composition comprising a graft copolymer between (1) a preformed thermoplastic polymer and (2) a two component monomer composition containing (a) at least one polymerizable monomer containing an ethylenically unsaturated polymerizable group and at least one functional polymer-modifying group and (b) at least one comonomer containing at least two ethylenically unsaturated polymerizable groups. The preformed thermoplastic polymer (1) and the monomer composition (2) contained in the modified polymer are used in proportions such as to form a masterbatch concentrate for blending with unmodified polymer. The resulting graft copolymer has a gel content of less than 0.5% by weight and is substantially free of unbound monomer. By the term "substantially free of unbound monomer," we mean that less than 10% of the starting monomer remains in the graft copolymer and can be removed by physical separation processes.

The present invention also provides a method of preparing a modified polymer capable of being blended as a masterbatch with an unmodified polymer by reacting together at a temperature of from 70° C. to 300° C. in a melt and in the presence of free radicals while applying shear to the melt, a preformed thermoplastic polymer to be modified and a two component monomer composition containing (a) at least one polymerizable monomer having ethylenically unsaturated polymerizable group and at least one function polymer-modifying group and (b) at least one comonomer containing no functional polymer-modifying group but at least two ethylenically unsaturated polymerizable groups. This grafts the polymerizable monomer or monomers to the preformed polymer leaving substantially no unbound monomer. The reaction is continued for a period of time such that the torque used in applying shear to the melt passes through a peak and then falls again, and this produces a graft copolymer that is thermoplastic with a gel content of less than 0.5% by weight and that can be blended with an unmodified polymer.

The graft copolymer composition is thus typically formed from three components, i.e. a preformed thermoplastic polymer (sometimes hereinafter called the unmodified polymer), a ethylenically unsaturated polymerisable monomer containing a ethylenically unsaturated polymerisable group and one or more functional polymerisable groups, and a comonomer that contains two or more, e.g. 3, ethylenically unsaturated polymerisable groups.

Preferably the preformed thermoplastic polymer (1) and the monomer composition (2) are used in proportions such as to form a masterbatch concentrate for addition to unmodified polymer.

Hence the invention also relates to polymer blends comprising an unmodified thermoplastic polymer and a modified polymer according to the invention.

The monomer composition may be a mixture of (a) at least one monomer possessing a functional group and a single ethylenically unsaturated polymerisable group and (b) at least one comonomer having at least two ethylenically unsaturated polymerisable groups with or without a functional polymer-modifying group. Usually the comonomer has no functional polymer-modifying group.

The comonomer (a) or, if more than one comonomer (a) is used, each comonomer (a) contains usually one ethylenically unsaturated polymerisable group, and the or each comonomer (b) contains usually two or three ethylenically unsaturated polymerisable groups. Such polymerisable groups, which may be the same or different in the monomer (a) and in the comonomer (b), are usually polymer reactive vinyl groups and may be selected from, for example, acryloyl, methacryloyl, allyl, vinyl- or allyl- substituted aromatic, heterocyclic, or cycloaliphatic groups, and vinyl or allyl ester groups. If desired, the or each comonomer (b) may contain two or more different ethylenically unsaturated polymerisable groups.

By the term "functional polymer-modifying group", or "functional group", is intended a group which imparts physical or chemical activity to a molecule and examples of such which may be utilised in the present invention are carboxyl, ester, amine, amide, acyl, anhydride, thiol and silane groups. Particular examples of suitable materials are; groups which modify the ageing behaviour of the polymer such as, chain-breaking antioxidants (notably hindered phenols, hindered aliphatic amines and aromatic amines); peroxide decomposing antioxidants such as sulphides, dithiocarbamates, xanthates, dithiophosphates, mercaptobenzothiazoles, mercaptobenzimidazoles, phosphites and cyclic phosphate esters; photosensitisers such as transition metal compounds, particularly iron dithiocarbamates; UV absorbers such as, 2-hydroxybenzophenones and 2-hydroxybenzothiazoles; and, metal deactivating agents such as ethylene diamine tetraacetic acid, disalicylidine ethylene diamines and bis-hydrazides. Another class of suitable materials contains groups which modify the physical behaviour of the polymer such as, polar groups attached to non-polar polymers to give increased—adhesion to inorganic substrates, for example, $NO_2$, $Cl$, $CN$, $SO_3H$, and $R_4N^+$, or, non-polar groups attached to polar polymers such as PVC to give a plasticising effect.

The said monomer composition may, therefore, comprise (i) at least one monomer having molecules containing one or more desired functional groups and which also contain one ethylenically unsaturated polymerisable group capable of being attached to the polymer and (ii) at least one co-reactant in the form of a comonomer whose molecules need not possess the desired functionality but which have at least two ethylenically unsaturated polymerisable groups capable of being attached to the polymer.

It is known in polymer technology that monomers containing two or more polymerisable groups, such as vinyl or allyl groups, very often act as cross-linking agents upon introduction into polymers by copolymerisation or by graft polymerisation. Examples of such teachings in the prior art include the above mentioned EP-A-0247861, EP-A-0044233, JP-A-58/67446, JP-A-53/8693 and JP-A-53/8694. Moreover it is recognised that the more polymerisable groups that are present in a monomer, the greater is the tendency to introduce cross-linking into the molecules of a graft polymer or of a copolymer. Hence, in general, a monomer containing three or more polymerisable groups is a better cross-linking agent than a similar monomer having only two such groups. Such cross-linking is usually accompanied by a corresponding increase in rigidity of the resulting copolymer or graft polymer, with the result that a graft polymer formed by modifying a thermoplastic polymer using a comonomer with two, three or more polymerisable groups may prove to be too intractable to permit blending with an unmodified polymer, such as the unmodified polymer from which the graft polymer is prepared.

It is accordingly very surprising that, although the comonomer contains two or more ethylenically unsaturated polymerisable groups and hence would be expected to introduce cross-linking into the graft polymer molecule and to render it too intractable to permit blending into unmodified polymer, yet using the teaching of the present invention it is possible to produce graft polymers which are of similar molecular weight to the original polymer and which are still thermoplastic so that they can be blended with unmodified polymers as though they contained no modifying groups in substantially any proportion, for example in a weight ratio of from about 100:1 to about 1:100. Hence the invention provides a considerable advance in making polymeric additives which can be used as additives for introducing desired properties into polymer compositions.

It is further surprising that the invention can be practised using polymers, such as polypropylene, which normally tend to undergo depolymerisation at high temperatures in the presence of free radicals, and that the resulting modified polymer does not suffer a significant reduction in molecular weight.

The invention also provides a method of preparing the modified thermoplastic polymers aforesaid comprising reacting together, in a melt and in the presence of free radicals whilst applying shear to the melt, a preformed thermoplastic polymer to be modified and a two component monomer composition comprising (a) at least one polymerisable monomer containing a ethylenically unsaturated polymerisable group and at least one functional polymer-modifying group and (b) at least one comonomer containing at least two ethylenically unsaturated polymerisable groups, thereby to graft said monomer to said preformed polymer leaving substantially no unbound monomer, the reaction being continued for a period of time sufficient to produce a graft copolymer that is thermoplastic and can be blended with an unmodified polymer.

This reaction is preferably conducted in the absence of free molecular oxygen.

This principle, although applicable to antioxidants and stabilisers, is also more broadly applicable to any kind of modifying agent for polymers including agents whose function is to improve adhesion of the polymer to inorganic materials (such as metals, glass, fibres and fillers), agents to plasticise or to cross-link the polymer, to modify the electrical or thermal conductivity of the polymer, to modify dyeability, to modify the surface properties (for example hydrophilicity or antistatic behaviour), agents to impart particular chemical reactivity to the polymer so that it can be reacted with other polymers or with similarly modified polymers to give block or graft copolymers which can be used as solid phase dispersants in polymer blends (so-called "compatibilisers") and agents which photosensitise the photo-oxidation of polymers. This list is not intended to be exhaustive since the process of the invention is applicable to any polymer modification reaction where, ideally, no low molecular weight modifier or oligomer remains in the polymer after reaction. That is, the modifying agent becomes an integral part of the polymer as a result of reaction of its polymerisable group and cannot be removed by physical separation processes.

The invention is based on the discovery that polymer modifying molecules can be grafted to polymers, using melt reaction conditions and with application of mechanical shear, in the presence of free radicals, leaving few or none of the modifier molecules in the free state in which they could subsequently leach from the polymer in use. To enable this to be effected, it is necessary to introduce a polymer-reactive group into the modifier molecule in addition to the structures which impart the modifying property. In total there have to be at least three ethylenically unsaturated polymerisable groups in the monomer composition and this may be achieved by providing two (or more) such groups in the comonomer and one such polymerisable group on the modifier molecule provided that the comonomer need not have any modifying properties so long as it contains two or more ethylenically unsaturated polymerisable groups.

The graft polymerisation reaction may be conducted in the presence of a free radical generator such as an organic peroxide or an azo compound. Alternatively the graft polymerisation reaction can be carried out in the presence of free radicals produced solely by the shearing of the polymer, for example in an extruder or high shear mixer. Ultrasound or ultraviolet irradiation or by any high energy radiation, such as ionising radiation from a nuclear reactor or from a radioactive source, can be used to generate free radicals.

The polymer is modified by use of a two component monomer composition containing a minimum of two components, for example:

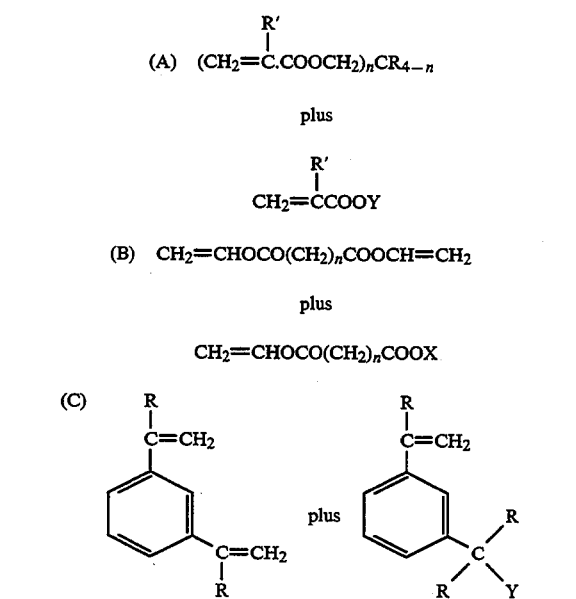

where X is ethylenically unsaturated polymerisable group, Y is a group or a mixture of groups possessing the desired modifying functionality, and R and R' which may be the same or different are alkyl, aralkyl or other substituents. Throughout this specification any alkyl groups, or alkylene group forming, for example, part of an aralkyl group, contains preferably from 1 to 6 carbon atoms and even more preferably 1 to 4 carbon atoms.

The invention provides a particularly convenient way of incorporating more than one modifying molecule into a polymer bound masterbatch functional compound provided the modifying molecules are copolymerisable with the comonomer which contains more than one polymerisable group, e.g. mixtures of modifying molecules of the formulae:

where Y and Z represent different functional polymer-modifying groups.

This is particularly valuable in antioxidant/modifier technology where synergistic combinations of bound antioxidants are frequently required.

The modifying groups represented by Y and Z may be any desired functional groups, and may typically contain antioxidants, UV absorbers, dyeing modifiers, cross-linkable groups, coupling agents, groups to promote adhesion, reactive groups to which to attach a second polymer chain, plasticiser groups and the like.

Examples of polymerisable monomers are as follows:

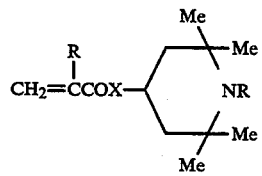

where X represents O, NH, or S;

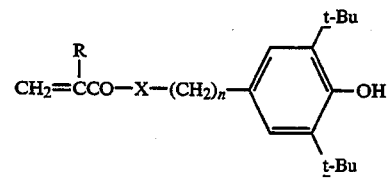

where n is zero or an integer from 1 to 10, and X is O, NH or S;

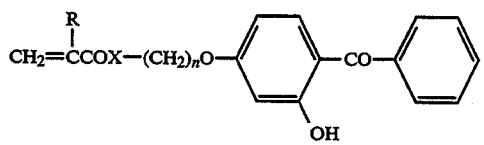

where n is an integer from 1 to 16, and X is O, NH or S;

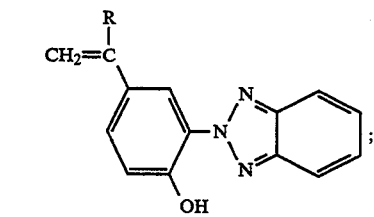

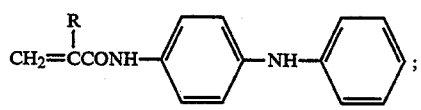

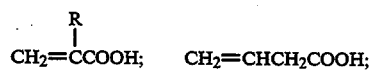

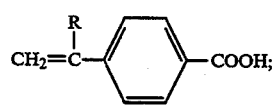

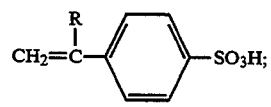

$CH_2=CHSi(OCH_3)_3;$ $CH_2=CHCONHCH_2CH_2Si(OCH_3)_3;$ $CH_2=CHCOOCH_2CH_2Si(OCH_3)_3;$

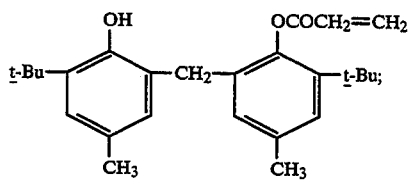

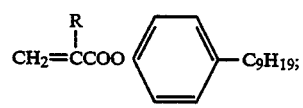

$CH_2=CHCOOt\text{-}C_8H_{17};$ and

where R is hydrogen or an alkyl or aralkyl group, R' is an alkyl or aralkyl group and X⁻ is a polymer compatible anion, such as a chloride anion.

Examples of comonomers include the following:

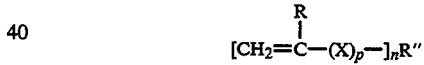

where R is as defined above; R" is an aliphatic, heteroaliphatic, cycloaliphatic, aromatic, or heterocyclic group; n is an integer of at least 2, preferably an integer in the range of from 2 to 6; X is a divalent radical which may include one or more linking groups such as —CO—O—, —CO—NH—, —O—, —S—, —NR$_1$—, and —CR$_1$R$_2$—; R$_1$ and R$_2$ are each a hydrogen atom or a hydrocarbon radical, such as an alkyl radical; and p is zero or 1.

Representative examples of comonomers which may be used are:

 (i)

 (ii)

 (iii)

-continued
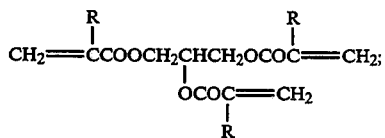 (iv)
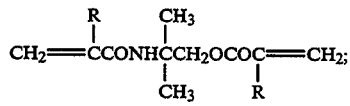 (v)
 (vi)
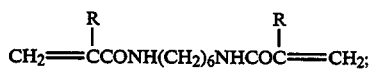 (vii)
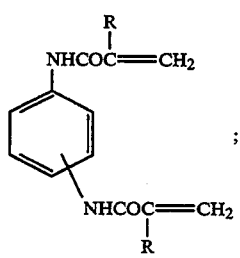 (viii)
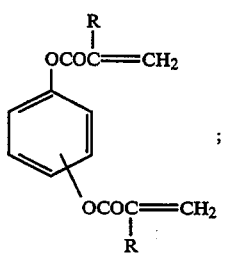 (ix)
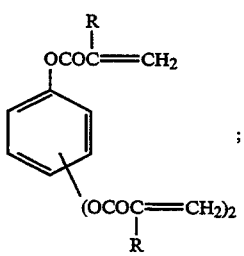 (x)
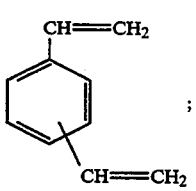 (xi)
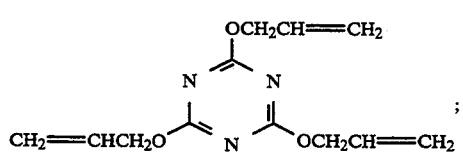 (xii)
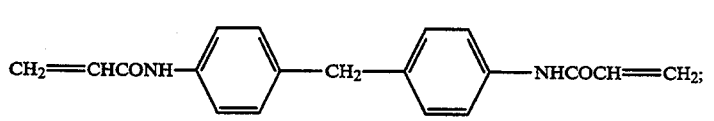 (xiii)

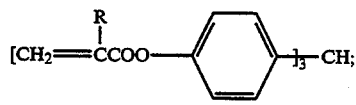

and

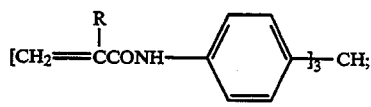

where R is a hydrogen, alkyl or aralkyl group.

In formulae (viii), (ix) and (xi) the second indicated group can be in the o-, m-, or p- position. In formula (×) the three groups can be in any permissible positions relative to one another.

Specific examples of comonomers which can be used in the practice of the present invention include tris-acryloyl trimethylol propane (TMPTA) of the formula:

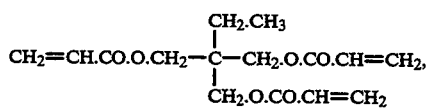

tris-acryloyl trimethylol butane (TMBTA) of the formula:

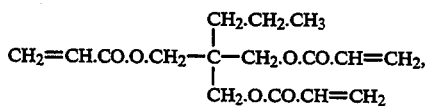

divinyl benzene (DVB), and triallyl cyanurate (TAC).

Preferred examples of polymerisable monomers containing a functional group and at least one functional polymer-modifying group include 2-hydroxy-4-($\beta$-acryloyloxyethoxy)-benzophenone (HAEB), 4-acryloyloxy-2,2,6,6-tetramethyl piperidine (AOTP), tetraethylene pentamine monoacrylate (TEPAA), vinyl trimethoxysilane (TMVS), $\beta$-acryloyloxyethyl trimethoxy silane (AETS), 4-vinylbenzoic acid (VBA), 2,6-di-t-butyl-4-hydroxybenzyl acrylate (DBHBA), and 2-(2'-hydroxy-5'-vinylphenyl) benzotriazole (HVPB).

Compounds which can be added as free radical generators include dicumyl peroxide (DCP), 2,5-bis-t-butylperoxy-2,5-dimethylhexane (otherwise called 2,5-dimethyl- 2,5-t-butyl-peroxy-hexane (BPH)), di-t-butyl peroxide (DTBP), and di-t-butyl peroxy carbonate (DTBPDC).

As examples of thermoplastic polymers which can be used in the invention as the starting polymer there can be mentioned, for example, vinyl polymers and copolymers and substantially linear condensation polymers. The invention can thus be used to modify vinyl polymers and copolymers including, for example, polyolefins, such as polyethylene and polypropylene, polyvinyl chloride, polystyrene, ethylene-propylene co- and terpolymers, polyacrylates, polymethacrylates, polyacrylonitrile, and acrylonitrile-butadiene-styrene terpolymers. Examples of thermoplastic condensation polymers which can be utilised in the practice of this invention include polyamides, such as nylon-6, nylon-66, nylon 610, and the like, linear polyesters, such as polyethylene terephthalate and polybutylene terephthalate, and the like, and linear and substantially linear polyurethanes.

Although the reaction mechanism has not been fully explored the results observed are consistent with the following explanation, the correctness or otherwise of which is not intended to affect the validity of the present application. In the melt free radicals are generated by the shearing forces applied which cause cleavage of the polymer chains and also as a result of decomposition of any free radical generator that may be added or as a result of any external influence, such as ionising radiation. Such free radicals can in turn strip hydrogen atoms off the polymer molecule to form corresponding free radicals on the polymer chain, with which the ethylenically unsaturated polymerisable groups on the monomer (a) or the comonomer (b) can then react to form side chains and even crosslink the polymer chains. At least the majority of such side chains and cross-linkages are then broken under the influence of the continued shearing to yield a modified polymer, typically with approximately the same molecular weight as the starting polymer, which is still thermoplastic and is compatible with unmodified polymer. However, in some cases, an increase in molecular weight can be observed and may not be disadvantageous.

Typical reaction conditions include, besides exclusion of free molecular oxygen, use of a temperature above the melting point of the thermoplastic polymer and higher than the decomposition temperature of the free radical generator, if used, and shear conditions sufficient to blend the components of the reaction melt but not such as to cause significant degradation of the unmodified polymer in the absence of the other components. Such reaction conditions may thus include use of a temperature of at least about 70° C., for example a temperature in the range of from about 130° C. to up to about 400° C. The precise temperature to be used in part by the melting point of the polymer and by its stability. In any event the temperature used should not be so high as to cause significant degradation of the polymer. Normally it will be preferred to use a temperature of not more than about 300° C., preferably in the range of from about 150° C. to about 230° C. If a free radical generator is used it should be selected so that its decomposition temperature is above the melting point of the melt, and preferably above the melting point of the unmodified polymer.

As will be appreciated, the lower the melting point of the unmodified polymer is, the lower is the temperature that can be contemplated for use in the method of the invention. Similarly, if an unmodified polymer of low melting point is selected, then the use of a free radical generator with a correspondingly low decomposition temperature can be contemplated. For example, when using an ethylene-propylene rubber in the method of the invention the use of a peroxydicarbonate, such as di-t-butyl peroxydicarbonate which has a decomposition point of about 100° C., can be contemplated. The precise reaction conditions to be used will thus depend upon the particular unmodified polymer selected and upon the free radical generator (if any) used, as well as upon the amounts of polymerisable monomer and comonomer that may be used, which will in turn affect the temperature at which a satisfactory melt is formed. The man skilled in the art will readily be able to find suitable reaction conditions for a given unmodified theremoplastic polymer by a process of trial and error, if necessary.

The reaction time will depend upon such factors as the type of polymer being treated, the reactivity of the at least one polymerisable monomer (a) and of the at least one commonomer (b), the decomposition temperature of any free radical generator added, and above all upon the type of equipment used to carry out the method of the invention, in particular upon its efficiency in heating, mixing and applying shear to the ingredients of the melt. It is typically at least about 2 minutes up to about 30 minutes. Normally it will be preferred to use a reaction time of less than about 20 minutes. In many cases it will suffice to use a reaction time of about 5 minutes up to about 15 minutes, for example when using polypropylene as the starting polymer. However, it is preferred to use as short a reaction time as possible, consistent with obtaining a graft copolymer that is thermoplastic and can be blended with unmodified polymer, so as to avoid significant degradation of the polymer.

The method of the invention can be operated batchwise using, for example, a Banbury mixer or other internal mixer. It may also be carried out in a continuous manner using a high shear mixer, such as a Bussko kneader or a twin screw extruder.

The progress of the reaction can be monitored in performance of a batch reaction by measuring the torque required to operate the mixer. It is found that this torque measurement initially increases, passes through a peak, and then falls, possibly back to a value substantially the same as that required to operate the mixer with a charge of the unmodified polymer and with no added monomer composition. The reaction is normally continued at least until the torque peak has passed.

Another way of monitoring the progress of the method of the invention is to measure the gel content of the resulting graft copolymer. A convenient way of measuring the gel content is to test the solubility of the graft copolymer in a suitable solvent. For example, when using polypropylene as the starting polymer, p-xylene is a suitable solvent. A method for measuring the gel content is described, for example in ASTM D-638-68. When the gel content has reduced substantially to zero, e.g. to about 0.5 percent by weight or less and preferably to about 0.1% by weight or less, then the graft copolymer will be thermoplastic and can be blended with modified polymer.

The molecular weight of the graft is typically approximately the same as the modified starting polymer or somewhat higher.

The invention will now be described, by way of illustration, by the following Examples. In each of Examples 1 to 4 and 6 to 8 an increase in melt viscosity was initially observed in the course of the reaction but upon continuing the reaction the melt viscosity dropped back substantially to its original value.

EXAMPLE 1

A mixture of unmodified polypropylene and 2-hydroxy-4-($\beta$-acryloyloxyethoxy)-benzophenone (HAEB) in a weight ratio 90:10, was processed in an internal mixer at 180° C. with the addition of tris-acryloyl trimethylolpropane (TMPTA) and dicumyl peroxide (DCP). The molar ratio of TMPTA to HAEB was 0.1:1 and the molar ratio of DCP to TMPTA was 0.002:1. The reaction time was 15 minutes. The product was compression moulded to film and the amount of the UV absorber (HAEB) remaining after extraction with methylene dichloride was estimated by UV spectroscopy. This was found to be 100% of the amount incorporated during processing and no HAEB could be detected in the extracting solvent.

EXAMPLE 2

Example 1 was repeated but dicumyl peroxide was replaced by 2,5-bis-t-butylperoxy-2,5-dimethylhexane (BPH) (Trade Mark Triganox 101) at a BPH:TMPTA molar ratio of 0.0025:1. The results on testing were the same as reported in Example 1.

EXAMPLE 3

Example 1 was repeated except that the HAEB was replaced by 4-acryloyloxy-2,2,6,6-tetramethyl piperidine (AOTP). After extraction, the films were found to contain all the original AOTP incorporated into the mix and none could be detected in the solvent.

EXAMPLE 4

Example 2 was repeated with replacement of the HAEB with AOTP. The same result as reported in the previous Examples was obtained.

EXAMPLE 5

Four grams of the product of Example 4 were mixed with 96 grams of unstabilised polypropylene in an internal mixer for 5 minutes at 180° C. Films were made by compression moulding of the polymer at 180° C. and were then extracted for 48 hours with methanol under reflux. The films were exposed to UV light in an accelerated weathering cabinet (sun lamp/actinic blue lamp) and were found to embrittle after 1800 hours. A conventional HALS (Tinuvin 770), incorporated into polypropylene at the same functional group concentration (0.4 g/100 g) was found to embrittle at 1500 hours before methanol extraction and at 130 hours following methanol extraction.

EXAMPLE 6

The mixing procedure of Example 5 is repeated with the modified polymer of Example 2 to give a blend with similar properties to that of Example 5.

EXAMPLE 7

Using a similar blending procedure to that described in Example 5 the modified polymer of Example 3 is admixed with an unmodified polypropylene. Compared with the unmodified polymer the blend shows good u.v. stability and resistance to oxidation.

EXAMPLE 8

When the procedure of Example 7 is repeated with the product of Example 4 similar results are obtained.

EXAMPLE 9

A mixture of unmodified polypropylene and tetraethylene pentamine monoacrylate (TEPAA) in a weight ratio of 95:5 was processed in an internal mixer at 180° C. with the addition of trimethylol propane triacrylate (TMPTA) and 2,5-dimethyl-2,5-t-butyl-peroxy-hexane (BPH). The molar ratio of TMPTA to TEPAA was 0.2:1 and the molar ratio of BPH to TMPTA was 0.0003:1. The reaction time was 10 minutes. The product was compression moulded to film and the amount of TEPAA remaining after extraction with dichloromethane was estimated by spectrophotometry. This was found to be 90% of the amount present before extraction.

EXAMPLE 10

A mixture of unmodified polypropylene and vinyl trimethoxysilane (TMVS) in a weight ratio of 90:10 was processed in an internal mixer at 180° C. with the addition of trimethylol propane triacrylate (TMPTA) and 2,5-dimethyl-2,5-t-butyl-peroxy-hexane (BPH). The molar ratio of TMPTA to TMVS was 0.1:1 and the molar ratio of BPH to TMPTA was 0.001:1. The reaction time was 10 minutes. The masterbatch product was compression moulded to film and the amount of TMVS remaining after extraction with dichloromethane was estimated by spectrophotometry. This was found to be 95% of the amount present before extraction. Silane linkages in the product are capable of being cross-linked by treatment with water.

EXAMPLE 11

A mixture of unmodified polypropylene and 4-vinylbenzoic acid (VBA) in a weight ratio of 99:1 was processed in an internal mixer at 180° C. with the addition of trimethylol propane triacrylate (TMPTA) and 2,5-dimethyl-2,5-t-butyl-peroxy-hexane (BPH). The molar ratio of TMPTA to VBA was 0.1:1 and the molar ratio of BPA to TMPTA was 0.0015:1. The reaction time was 10 minutes. The product was compression moulded to film and the amount of VBA remaining after extraction with dichloromethane was estimated by spectrophotometry. This was found to be 99% of the amount present before extraction.

EXAMPLE 12

The product of Example 9 is found to be compatible with polypropylene and to enable large amounts of alumina trihydrate to be blended therewith for the purpose of imparting flame retardant properties to the blend.

EXAMPLE 13

The product of Example 10 is compatible with unmodified polypropylene and the resulting blend can be admixed with glass fibres to give a satisfactory reinforced polymer product.

EXAMPLE 14

The product of Example 11 is found to be compatible with unmodified polypropylene. The resulting blend upon mixing with zinc oxide yields a satisfactorily cross-linked product. It also exhibits satisfactory antistatic properties and water wettability.

EXAMPLE 15

Following the general procedure of Examples 1 to 4, and 9 to 11 an ethylene-propylene rubber in admixture with β-acryloyloxyethyl trimethoxysilane (AETS) in a weight ratio of 90:10 is processed at 100° C. in an internal mixer with the addition of trimethylol propane triacrylate (TMPTA) and di-t-butyl peroxydicarbonate (DBPDC) until the torque passes through a peak and falls again. The molar ratio of TMPTA to AETS is 0.1:1 and the molar ratio of DBPDC to TMPTA is 0.001:1. The product is compression moulded and the incorporation of AETS is found to be efficient. It is readily dispersed in the unmodified rubber.

EXAMPLE 16

The procedure of Example 10 is repeated using, in place of vinyl trimethoxysilane (TMVS), an equivalent amount of β-acryloxyethyltrimethoxy silane. A similar product is obtained which is readily dispersed in unmodified polypropylene.

EXAMPLE 17

The procedure of Example 16 is repeated with polyethylene, polyethylene terephthalate, and nylon 6. The resulting graft copolymers can be blended with the corresponding unmodified polymer in each case with similar results.

EXAMPLE 18

A mixture of 90 parts by weight of unmodified polypropylene and 10 parts by weight of a mixture of 4-acryloyloxy-2,2,6,6-tetramethyl piperidine (AOTP) and trisacryloyl trimethylol propane (TMPTA) was processed in an internal mixer at 180° C. with the addition of 2,5-bis-t-butylperoxy-2,5-dimethylhexane (BPH). The weight ratio of TMPTA to AOTP was 20:80 and the molar ratio of BPM to the mixture of TMPTA and AOTP was 0.005:1. The reaction time was 10 minutes.

2.5 grams of the product were mixed with 95.3 grams of unstabilised polypropylene and with 0.2 g of "Cyasorb UV-531" (Trade Mark) in an internal mixer for 10 minutes at 180° C. Films were made by compression moulding of the thus treated polymer at 180° C.

Samples of film made in this way were exposed to UV light in an accelerated weathering cabinet (sun lamp/actisic blue lamp) and were found to embrittle after 3000 hours.

These results demonstrate a very high synergistic effect.

EXAMPLE 19

A mixture of unmodified polypropylene and acrylic acid (AA) in a weight ratio of 97.5:2.5 was processed in an internal mixer at 180° C. with the addition of trimethylol propane triacrylate (TMPTA) and 2,5-dimethyl-2,5-t-butyl peroxy hexane (BPH). The molar ratio of TMPTA to AA was 0.25:1 and the molar ratio of BPH to TMPTA was 0.0035:1. The reaction time was 10 minutes. The product was compression moulded to film and the amount of AA remaining after extraction with dichloromethane was estimated by spectrophotometry. This was found to be 92% of the amount present before extraction.

EXAMPLE 20

A mixture of unmodified polypropylene and acrylic acid (AA) in a weight ratio of 97.5:2.5 was processed in an internal mixer at 180° C. with the addition of triallyl cyanurate (or 2,4,6-triallyloxy-1,3,5-triazine) (TAC) and 2,5-dimethyl-2,5-t-butyl peroxy hexane (BPH). The molar ratio of TAC to AA was 0.30:1 and the molar ratio of BPH to TAC was 0.003:1. The reaction time was 10 minutes. The product was compression moulded to film and the amount of AA remaining after extraction with dichloromethane was estimated by spectrophotometry. This was found to be 95% of the amount present before extraction.

EXAMPLE 21

A mixture of unmodified polypropylene and 2,6-di-tert-butyl-4-acryloxyl benzyl phenol (DTBABP) in a weight ratio of 97:3 was processed in an internal mixer at 180° C. with the addition of Divinyl benzene (DVB) and 2,5-dimethyl-2,5-t-butyl peroxy hexane (BPH). The molar ratio of DVB to DTBABP was 1.5:1 and the molar ratio of BPH to DVB was 0.05:1. The reaction time was 10 minutes. The product was compression moulded to film and the amount of DTBABP remaining after extraction with dichloromethane was estimated by spectrophotometry. This was found to be 90% of the amount present before extraction.

EXAMPLE 22

Upon repeating the procedure of Example 7 with the modified polymers of Examples 19, 20 and 21 satisfactory blending with unmodified polypropylene is observed.

We claim:

1. A method of preparing a modified polymer capable of being blended as a masterbatch with an unmodified polymer comprising reacting together at a temperature of from 70° C. to 300° C. in a melt and in the presence of free radicals while applying shear to the melt, a preformed thermoplastic polymer to be modified and a two component monomer composition comprising (a) at least one polymerizable monomer containing an ethylenically unsaturated polymerizable group and at least one functional polymer-modifying group and (b) at least one comonomer containing no functional polymer-modifying group but at least two ethylenically unsaturated polymerizable groups, thereby to graft said polymerizable monomer to said preformed polymer leaving substantially no unbound monomer, the reaction being continued for a period of time such that the torque used in applying shear to the melt passes through a peak and then falls again, thereby to produce a graft copolymer that is thermoplastic with a gel content of less than 0.5% by weight and that can be blended with an unmodified polymer.

2. A method according to claim 1, in which the preformed thermoplastic polymer is a vinyl polymer or a linear condensation polymer.

3. A method according to claim 1, in which the polymerisable monomer is selected from the group consisting of 2-hydroxy-4-($\beta$-acryloyloxyethoxy)-benzophenone (HAEB), 4-acryloyloxy-2,2,6,6-tetramethyl piperidine (AOTP), tetraethylene pentamine monoacrylate (TEPAA), vinyl trimethoxysilane (TMVS), $\beta$-acryloyloxyethyl trimethoxy silane (AETS), 4-vinylbenzoic acid (VBA), 2,6-di-t-butyl-4-hydroxybenzyl acrylate (DBHBA), and 2-(2'-hydroxy-5'-vinylphenyl)-benzotriazole (HVPB).

4. A method according to claim 1, in which the polymerisable monomer is selected from the group consisting of compounds of the following formulae:

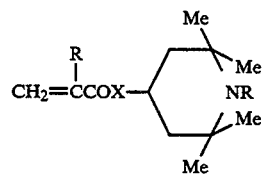

where X represents O, NH, or S;

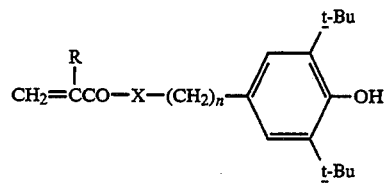

where n is zero or an integer from 1 to 10, and X is O, NH or S;

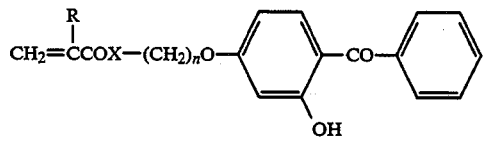

where n is an integer from 1 to 16, and X is O, NH or S;

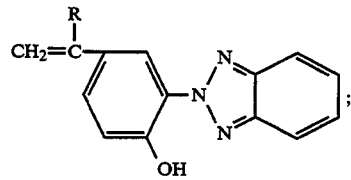

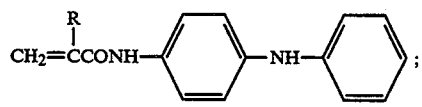

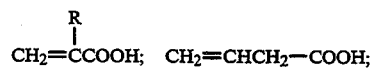

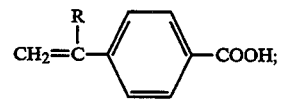

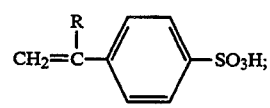

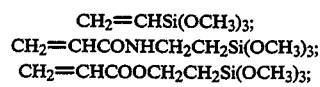

-continued

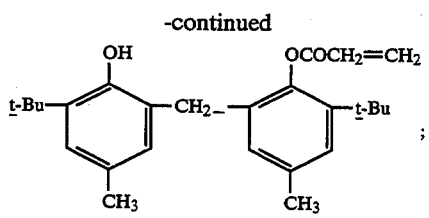

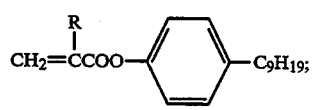

 (i)

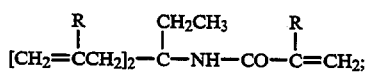 (iii)

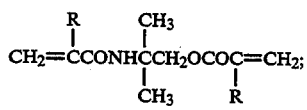 (v)

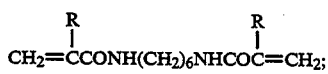 (vii)

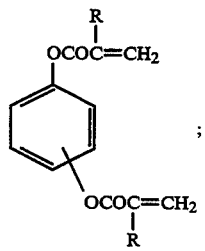 (ix)

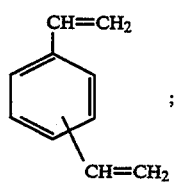 (xi)

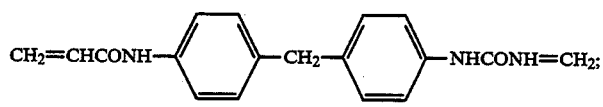 (xiii)

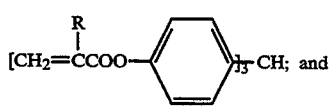 (xiv)

$CH_2=CHCOO\underline{t}\text{-}C_8H_{17};$ and

-continued

where R is hydrogen or an alkyl or aralkyl group, R' is an alkyl or aralkyl group and X⁻ is a polymer compatible anion.

5. A method according to claim 1, in which the co-monomer is selected from the group consisting of compounds of the following formulae:

 (ii)

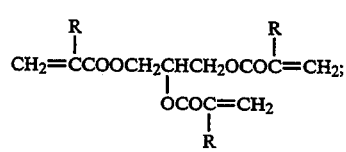 (iv)

 (vi)

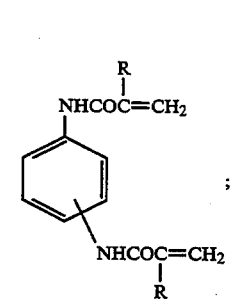 (viii)

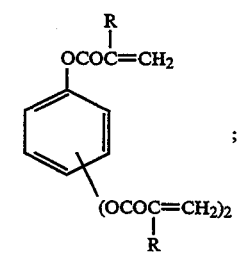 (x)

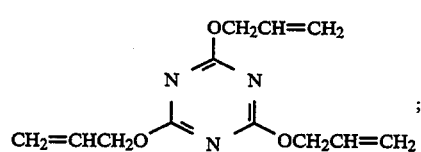 (xii)

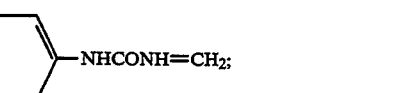

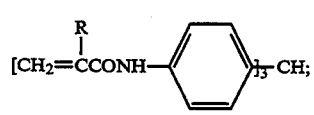 (xv)

where R is a hydrogen, alkyl or aralkyl group.

6. A method according to any one of claim 1, in which the comonomer is selected from the group consisting of tris-acryloyl trimethylol propane (TMPTA) of the formula:

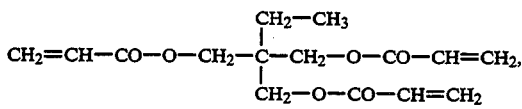

divinylbenzene (DVB), and triallyl cyanurate (TAC).

7. A method according to claim 1 in which the weight ratio of the monomer composition to the preformed thermoplastic polymer is from about 0.001:1 to about 2:1.

8. A method according to claim 1 in which the weight ratio of the monomer composition to the preformed thermoplastic polymer is from about 0.05:1 to about 1:1.

9. A method according to claim 1, in which the molar ratio of the comonomer to the polymerisable monomer is from about 0.05:1 to about 1:1.

10. A method according to claim 9, in which the molar ratio of the comonomer to the polymerisable monomer is from about 0.1:1 to about 0.5:1.

11. A method according to claim 1, in which the reaction is conducted in the presence of an added free radical generator.

12. A method according to claim 11, in which the added free radical generator is selected from dicumyl peroxide (DCP), 2,5-bis-t-butylperoxy-2,5-dimethylhexane (BPH), di-t-butyl peroxide (DTBP), and di-t-butyl peroxydicarbonate.

13. A method according to claim 11, in which there is added a free radical generator in a molar ratio of the free radical generator to the polymerisable monomer of from about 0.00005:1 to about 0.1:1.

14. A method according to claim 13, in which there is added a free radical generator in a molar ratio of the free radical to the polymerisable monomer of from about 0.0001:1 to about 0.02:1.

15. A method according to claim 1, in which the preformed thermoplastic polymer and the monomer composition are used in proportions such as to form a masterbatch concentrate for blending with unmodified polymer.

16. A method according to claim 1, in which the at least one functional polymer-modifying group in the polymerisable monomer (a) comprises a silicon-containing group.

17. A method according to claim 1, in which the silicon-containing group is of the formula —Si(OR')₃; where R' is an alkyl group of 1 to 4 carbon atoms.

18. A method according to claim 16, in which the graft polymer is subsequently subjected to cross-linking conditions whereby the silicon-containing groups present in the modified polymer from the polymerisable monomer (a) undergo cross-linking to form a cross-linked polymer.

19. A cross-linked polymer made by a method according to claim 18.

20. A modified polymer produced by a method according to claim 1.

21. A blend of a modified polymer according to claim 20 with an unmodified polymer.

22. Articles made from, or comprising, modified polymer according to claim 20.

23. A modified polymer capable of being blended as a masterbatch with an unmodified polymer, said modified polymer comprising a thermoplastic polymer composition comprising a graft copolymer between (1) a preformed thermoplastic polymer and (2) a two component monomer composition comprising (a) at least one polymerizable monomer containing an ethylenically unsaturated polymerizable group and at least one functional polymer-modifying group and (b) at least one comonomer containing at least two ethylenically unsaturated polymerizable groups, said preformed thermoplastic polymer and the monomer composition being in proportions such as to form a masterbatch concentrate for blending with unmodified polymer, and said copolymer having a gel content of less than 0.5% by weight and being substantially free of unbound monomer.

24. A modified polymer according to claim 23, in which the preformed thermoplastic polymer is a vinyl polymer, or vinyl copolymer or a linear condensation polymer.

25. A modified polymer according to claim 23, in which the polymerizable monomer is selected from the group consisting of compounds of the following formula:

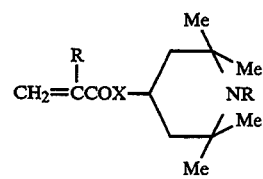

where X represents O, NH, or S;

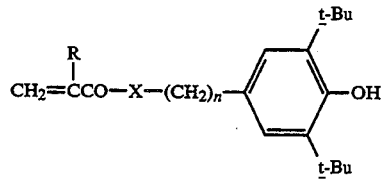

where n is zero or an integer from 1 to 10, end X is O, NH or S;

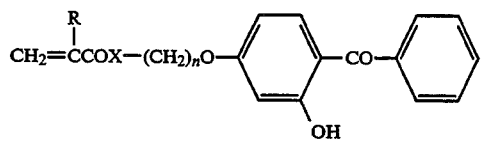

where n is an integer from 1 to 16, and X is O, NH or S;

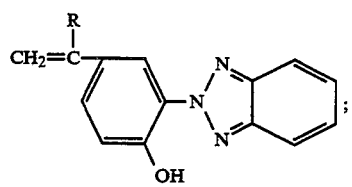

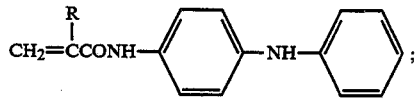

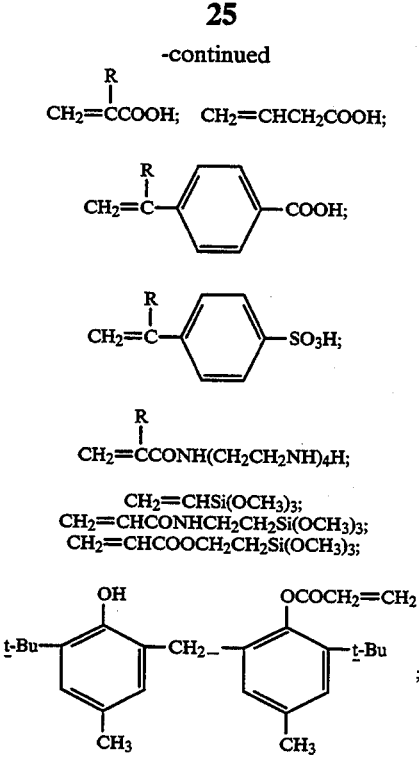

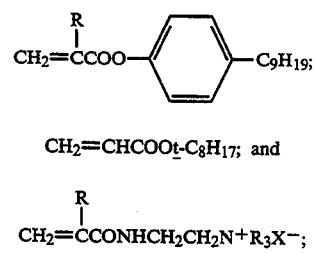

$CH_2=CHCOO\underline{t}-C_8H_{17}$; and $$CH_2=\overset{R}{\underset{|}{C}}CONHCH_2CH_2N^+R_3X^-;$$

where R is a hydrogen, alkyl or aralkyl group.

26. A modified polymer according to claim 23 in which the polymerizable monomer is selected from the group consisting of 2-hydroxy-4-($\beta$-acryloyloxyethoxy)-benzophenone (HAEB), 4-acryloyloxy-2,2,6,6-tetramethyl piperidine (AOTP), tetraethylene pentamine monoacrylate (TEPAA), vinyl trimethoxysilane (TMVS), $\beta$-acryloyloxyethyl trimethoxy silane (AETS), 4-vinylbenzoic acid (VBA), 2,6-di-t butyl-4-hydroxybenzyl acrylate (DBHBA), and 2-(2'-hydroxy-5'-vinylphenyl)-benzotriazole (HVPB).

27. A modified polymer according to claim 23 in which the comonomer is selected from the group consisting of compounds of the following formulae:

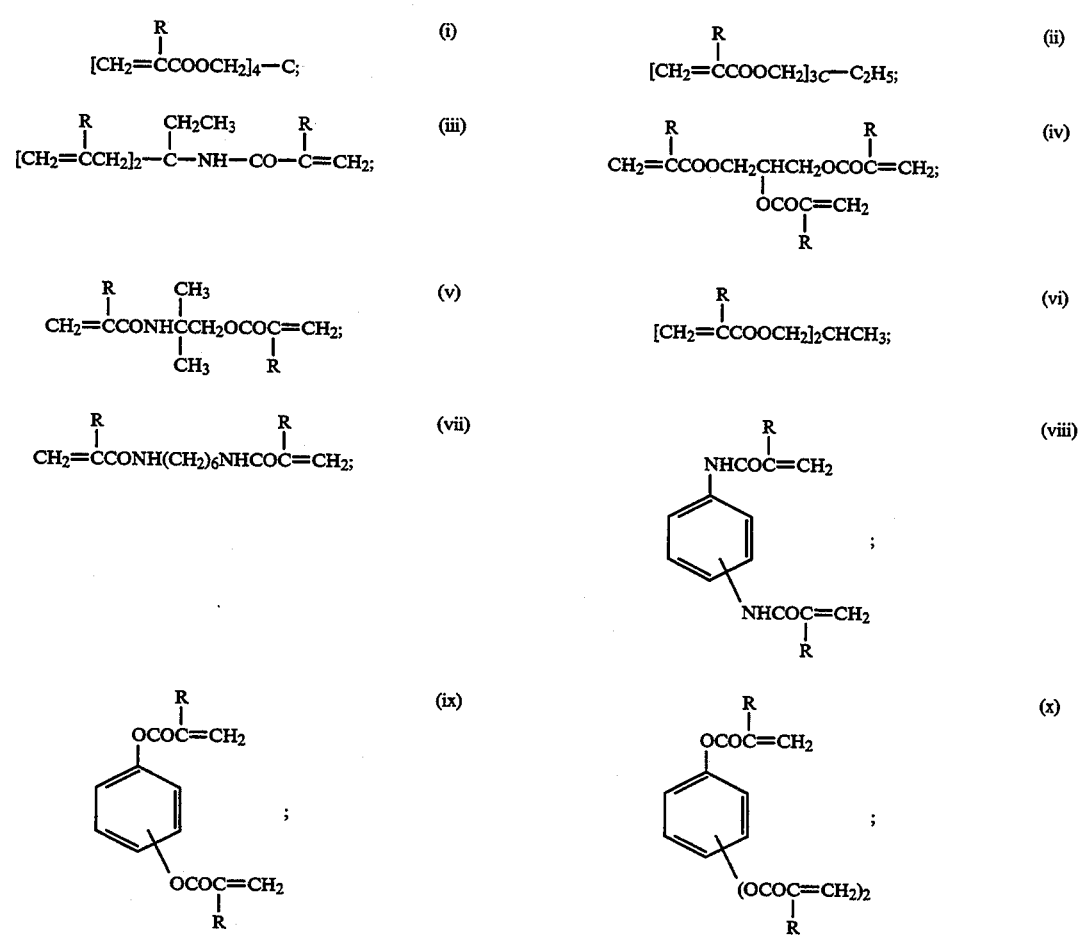

-continued

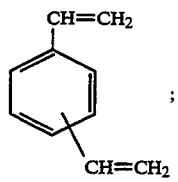
(xi)

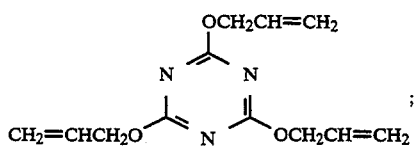
(xii)

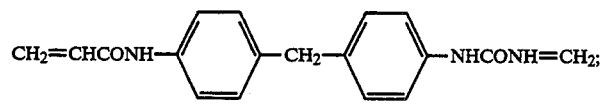
(xiii)

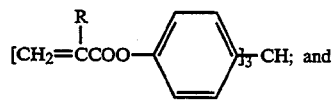 (xiv)

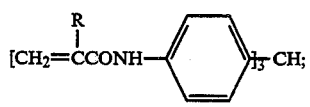 (xv)

where R is hydrogen or an alky or aralkyl group, t-$C_8H_{17}$ is tert-$C_8H_{17}$, R' is an alkyl or aralkyl group and $X_1$ is a polymer compatible anion.

28. A modified polymer according to claim 23 in which the comonomer is selected from the group consisting of tris-acryloyl trimethylol propane (TMPTA) of the formula:

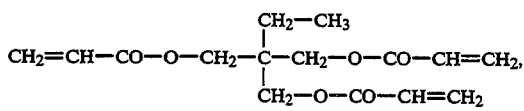

divinylbenzene (DVB), and triallyl cyanurate (TAC).

29. A modified polymer according to claim 23 in which the weight ratio of the monomer composition to the preformed thermoplastic polymer is from 0.001 to 2:1.

30. A modified polymer according to claim 29 in which the weight ratio of the monomer composition to the preformed thermoplastic polymer is from 0.05:1 to 1:1.

31. A modified polymer according to claim 23 in which the molar ratio of the comonomer to the polymerizable monomer is from 0.05:1 to 1:1.

32. A modified polymer according to claim 31 in which the molar ratio of the comonomer to the polymerizable monomer is from 0.1:1 to 0.5:1.

33. Articles made from or comprising a modified polymer according to claim 23.

* * * * *